US012694766B2

(12) United States Patent
Wingate

(10) Patent No.: US 12,694,766 B2
(45) Date of Patent: Jul. 28, 2026

(54) WAITPERSON NOTIFICATION AND FEEDBACK INDICATOR DEVICE

(71) Applicant: Doug Duane Wingate, Palm Harbor, FL (US)

(72) Inventor: Doug Duane Wingate, Palm Harbor, FL (US)

( * ) Notice: Subject to any disclaimer, the term of this patent is extended or adjusted under 35 U.S.C. 154(b) by 68 days.

(21) Appl. No.: 18/206,871

(22) Filed: Jun. 7, 2023

(65) Prior Publication Data

US 2023/0419796 A1 Dec. 28, 2023

Related U.S. Application Data

(60) Provisional application No. 63/355,343, filed on Jun. 24, 2022.

(51) Int. Cl.
*G09F 17/00* (2006.01)
*G08B 7/06* (2006.01)
*G09F 7/18* (2006.01)

(52) U.S. Cl.
CPC ............... *G08B 7/068* (2013.01); *G09F 7/18* (2013.01); *G09F 17/00* (2013.01)

(58) Field of Classification Search
CPC ............ G08B 7/068; G09F 7/18; G09F 17/00
USPC .................................................. 116/173–175
See application file for complete search history.

(56) References Cited

U.S. PATENT DOCUMENTS

| | | | | | |
|---|---|---|---|---|---|
| 1,786,459 | A * | 12/1930 | Simons | A61J 9/0692 | 248/104 |
| 2,229,475 | A * | 1/1941 | Redmer | F16B 7/105 | 248/188.5 |
| 2,764,122 | A * | 9/1956 | Irvin | B60R 13/00 | 248/539 |
| 3,438,651 | A * | 4/1969 | Hertoghe | B62J 6/20 | 248/539 |
| 5,039,100 | A * | 8/1991 | Cortese | A63B 61/02 | 473/492 |
| 5,192,041 | A * | 3/1993 | Bryant | A61J 9/0684 | 248/104 |
| 5,557,876 | A * | 9/1996 | Parker | A01K 97/10 | 248/538 |
| 6,039,456 | A * | 3/2000 | Chabria | F21V 15/01 | 362/205 |
| 6,455,767 | B1 * | 9/2002 | Muller | F21S 9/037 | 40/604 |
| 10,068,438 | B2 * | 9/2018 | Muntasser | G08B 5/02 | |
| 11,019,466 | B1 * | 5/2021 | Johnson | B60Q 1/482 | |

(Continued)

*Primary Examiner* — Cassandra Davis
(74) *Attorney, Agent, or Firm* — NK Patent Law

(57) ABSTRACT

A waitperson notification and feedback indicator device allows customers to provide feedback to a waitperson during a service interaction. The device includes a support base, pole, and signal device. The device can be placed on or attached to a patron's table during service and is configured to notify a waitperson that attention is required, indicate feedback regarding satisfaction with the service, or both. The support base is a pedestal, clip, or clamp. The pole and signal device attach to the support base. The length of the pole is fixed or variable. The signal device is a flag, sign, placard, or electronic visual device, such as a customizable light panel. One of more of the support base, pole, and signal device can include lights and a control. The pole can also include an adjustable notification unit housed inside or disposed on the pole that deploys to extend therefrom.

13 Claims, 16 Drawing Sheets

(56) References Cited

U.S. PATENT DOCUMENTS

| | | | | |
|---|---|---|---|---|
| 2004/0134108 | A1* | 7/2004 | Harari | G09F 7/04 40/591 |
| 2005/0237165 | A1* | 10/2005 | Shimoni | B60Q 1/2657 362/543 |
| 2009/0165698 | A1* | 7/2009 | Lapkin | G09F 17/00 116/173 |
| 2014/0313761 | A1* | 10/2014 | Nelson-Herron | G09F 17/00 362/543 |
| 2017/0239545 | A1* | 8/2017 | Herbst | A63B 63/003 |
| 2018/0312107 | A1* | 11/2018 | Perkins | B60Q 1/2615 |

* cited by examiner

WAITPERSON NOTIFICATION AND FEEDBACK INDICATOR DEVICE

CROSS-REFERENCE TO RELATED APPLICATIONS

This application claims priority to U.S. Provisional Patent Application 63/355,343 entitled "WAITPERSON NOTIFICATION AND FEEDBACK INDICATOR DEVICE" which was filed on Jun. 24, 2022, the entire contents of which is hereby incorporated by reference in its entirety.

TECHNICAL FIELD

This present disclosure pertains to customer notification and feedback devices, specifically a system and device configured to signal a waitperson during a service interaction and provide feedback on behalf of the customer.

BACKGROUND

Waiting tables is a vital and prevalent profession in the United States, but customer interactions remain largely unchanged. In many countries, including the United States, tipping is a customary practice used to indicate satisfaction with a customer interaction and service quality from the waitstaff and establishment. However, tipping typically occurs at the end of an interaction, leaving the waitstaff unaware of what a customer thinks about the service prior to the interaction being over. The outcome of a service interaction and a customer's satisfaction generally depends on the waitstaff s attentiveness to the customer's needs, which can often be varied and challenging to discern. Additionally, initiating feedback before the end of the interaction can be uncomfortable and awkward for both the patron and the waitstaff, particularly if the feedback is not positive. Accordingly, there is a need for a way that allows patrons to signal that they require attention and provide feedback on their service during an interaction and that alleviates some of the discomfort associated with prior methods of feedback communication.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In view of the above difficulties and limitations of the art, embodiments of an apparatus for waitperson notification and feedback indication are provided. More specifically, the present invention relates to a waitperson notification and feedback indication device for use at or around the place setting for a patron that, in one or more embodiments, allows for notification that attention is required and provides an indication of feedback during a service interaction, without a patron having to flag down a waitperson or vocally provide feedback, in certain aspects of the invention. Moreover, the device may mitigate some of the awkwardness of vocally provided feedback, in certain aspects.

According to one or more embodiments, a waitperson notification and feedback device generally comprises a support base, pole, and a signal device which can be placed on or attached to a patron's table to provide notification that specific attention is required and/or feedback on the satisfaction of the patron with the level of service.

According to a specific embodiment, the device comprises a pedestal, as a support base, to which a pole of finite size is affixed and a flexible flag, as a signal device, slidably engaged on that pole to raise and lower relative to the pedestal. A patron may place the pedestal on the table and move the flag up and down the pole to provide an indication of their level of satisfaction with the service interaction or to provide notification that the patron needs attention for a specific reason, such as to get a refill or ask for napkins. In various embodiments, one or both of the pole and flag might also be interchangeable. For example, a patron might have be able to replace and attach different color, shape, or designed flags to either indicate a particular service request, such as for a refill, or to indicate satisfaction with service. Alternatively, the flag and pole might be integrally formed and interchanging a signal device might include changing the pole along with the signal device. In such an embodiment, a user might be able to select a pole and flag combo from a variety thereof.

According to other embodiments, the device might comprise a clip, as a support base, to which a pole of finite size is affixed with a flag slidably engaged on that pole to be raised and lowered relative to the pole and the pedestal. A patron may attach the clip to a table and move the flag up and down the pole to provide an indication of their level of satisfaction with the service interaction or to provide notification that the patron needs attention for a specific reason in embodiments. In various embodiments, the pole might comprise a variable length pole, such as a telescoping pole, to which a signal device, like a rigid panel, is attached. Thereby, the signal device would not necessarily need to slide up and down the pole, as the pole itself could be extended and retracted to move the signal device and notify or provide feedback to a waitperson. Moreover, the signal device might be integrally formed with a variable length pole and the pole itself might be interchangeable with another pole having a different flag in embodiments. The ability to replace one or both of the pole and flag allows each to be replaced when damaged or worn out, extending the life of such a device.

According to yet another embodiment, the device might comprise a clip, as a support base, having one or more holes defined in the handle of the clip with a pole having a flag at the end passing through the holes. In such an embodiment, the flag may be raised and lowered through the holes, to notify or provide feedback to a waitperson. The pole and flag may be held in a desired position by frictional engagement with an engaging unit, such as a gripping gasket lining the perimeter of one or more of the holes in an embodiment. Alternatively, the pole and flag may also be held in a desired position by a stopper apparatus attached to the pole, such as by one or more elastic bands or clamps disposed on the pole which are generally unable to pass through the hole when disposed on the pole in other embodiments. Further, the pole and flag may also be held in position by an engaging unit, such as a clamp, affixed to a portion of the support base and holding the pole stationary. The engaging unit configured to selectively actuate between a first open position and a second closed position wherein the engaging unit frictionally engages the elongated body segment in the second position.

While the above embodiments describe a support base as being one of a pedestal and a clip, it is to be understood that the support base may comprise other structures. For example, the support base may be integral with the table itself, such as in the case of a table having a hole to accept an end of a pole. Alternatively, an assembly of legs affixed to or separate from a pole might also be utilized. Indeed, any structure which provides the necessary attachment and support for a pole a flag combo might be utilized and foreseen as a support base. For example, the support base may be a box or container to which ballast may be added to further stabilize the support base. In addition, it is also understood that the support base might optionally have an adherent unit to affix or frictionally engage a table. For example, a pedestal and table might have matched and mating hook and loop fastener segments disposed thereupon to secure the pedestal to a table. Alternatively, a removably sticky surface might be disposed upon a surface of a support base to frictionally engage a table and secure the support base thereto.

Further, it is also foreseen that the pole disclosed above might have any sized and shaped cross section relative to its length useful to allow a user to carry out the purpose of notification and/or feedback. For example, the cross section of the pole might be round, triangular, square, rectangular, pentagon, hexagon, heptagon, or so forth in embodiments. Likewise, the length of the finite sized pole might be any which allows use for the purpose of notification and/or feedback. Indeed, a longer pole might be useful if the height of a signal device slidably engaged thereupon is used to communicate satisfaction with a service interaction in embodiments. Thereby, a user might have more distinct variations on height and, accordingly, more distinct variations on service feedback. For example, a patron might be able to distinctly and noticeably position a flag all the way up, all the way down, or at distinctive incremental points located therebetween in embodiments. The distinct incremental points might be identified by height indicators disposed on the surface of the pole in embodiments. Indeed, a shorter pole might not allow for easy interpretation of a flag location along a pole, that is it might not be easy for a waitperson to see a flag is ⅔ up a pole versus a flag that is ¾ up a pole. However, such a short pole might be desirable should an establishment wish to limit the variations on feedback to prevent confusion in embodiments.

Moreover, while the signal device above is identified as a flexible flag or rigid panel in the various embodiments, it is foreseen that other structures might be suitable for notification and feedback purposes. In embodiments where the signal device is identified as slidable relative to the pole, it is foreseen that this might be via a channel integral or affixed to a portion of the signal device, through which the pole passes and in which the pole is frictionally engaged, securing the flag to a portion thereof. Alternatively, the signal device might have one or more clips integral or affixed to a portion of the signal device, through which a pole might be inserted or into which a pole might be snap secured, if the clip has an open side allowing for such engagement. Moreover, it is also foreseen that the signal device might have one or more magnetic structures integral or affixed to a portion thereof to engage a metallic pole, allowing for the signal device to be magnetically affixed to the pole without any additional necessary structure.

Similarly, the device may further comprise magnetic portions to mate with and connect with other magnetic portions or ferrous materials associated with other portions of the device. Indeed, the magnetic portions can be disposed on and connect one or more of the support base, pole, and signal device in various embodiments. Further, the device may also comprise lights and a control unit, such as a switch or dial in certain embodiments. Lights, and control units, might be disposed along any of the various portions of the device. For example, the signal device in various embodiments might comprise a small LED panel which is optionally capable of having customizable colors or designs, potentially to identify different services requested or specific feedback. In another example, the signal device in various embodiments might comprise a small electroluminescent (EL) panel. Moreover, the lights and control unit might also be electrically coupled with a power supply, such as batteries in further embodiments. In at least one embodiment, each of the power supply, lights, and control unit might be connected through power connectors, which are selectively coupled together and can be decoupled to allow for replacement and repair of portions.

Moreover, the device may also include a notification unit in embodiments. The notification unit can include a pivoting segment, such as a strip of material, or an extending segment, such as a tube or column, in embodiments. The notification unit can be adjusted between a stored position and a deployed position, to extend away from the pole, in embodiments. In embodiments, the stored position is adjacent the pole, particularly with respect to a pivoting segment, and within the pole, particularly with respect to the extending segment, in embodiments. Indeed, in embodiments wherein the notification unit is an extending segment, the extending segment might be disposed in the interior of a pole. In embodiments, the extending segment may be moved into a deployed position and locked into a stored position relative to the pole due to a spring loaded mechanism, which can be disposed within the pole.

BRIEF DESCRIPTION OF THE DRAWINGS

The foregoing, as well as the following Detailed Description, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1A:
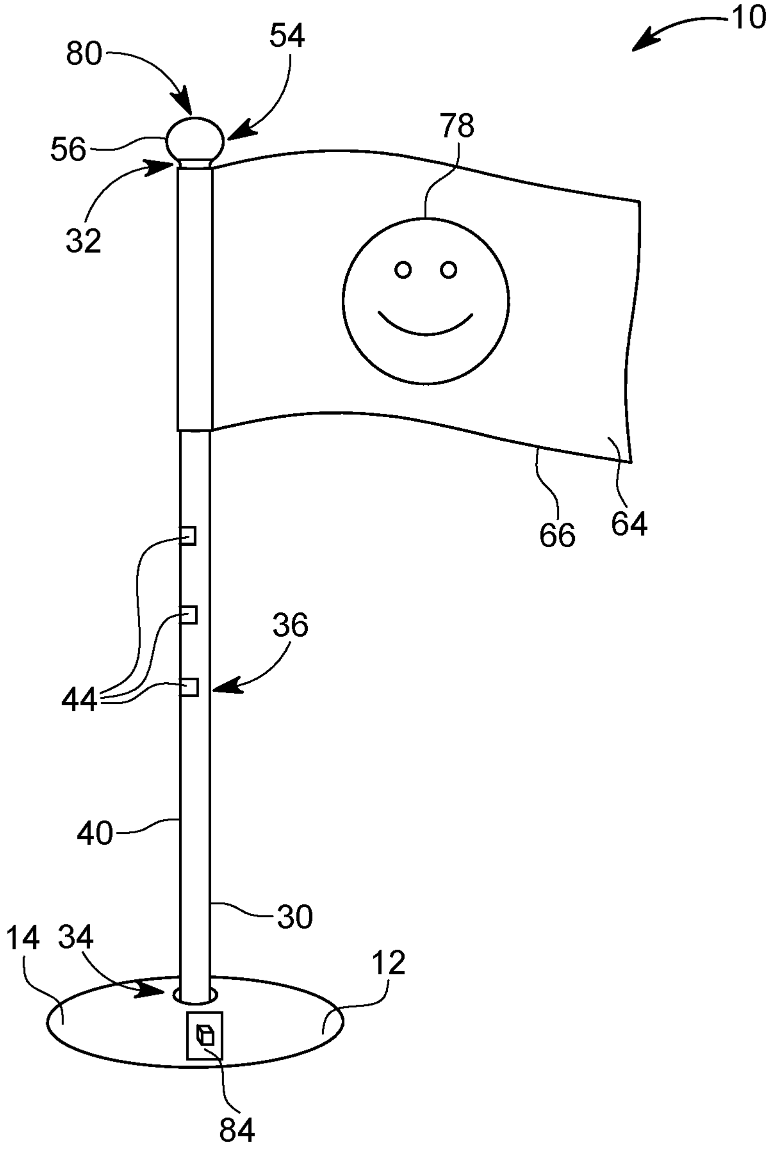
FIG. 1A illustrates a perspective view of a waitperson notification and feedback indicator device according to one or more embodiments including a pedestal and finite sized pole with a slidably engaging flag in a fully raised position.

The following description and figures are illustrative and are not to be construed as limiting. Numerous specific details are described to provide a thorough understanding of the disclosure. In certain instances, however, well-known or conventional details are not described in order to avoid obscuring the description. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure.

Overview

As seen in FIGS. 1A-5A and 6A-8B, embodiments of a waitperson notification and feedback indicator device 10 generally comprises a support base 12, a pole 30, and a signal device 64 affixed together and disposed at or near a patron's place setting, such as on a table, and configured to notify a waitperson that their attention is required, indicate feedback regarding the satisfaction with the service encounter to a waitperson, or both. In embodiments, the pole 30 generally has a first end 32 and opposed second end 34 with an elongated body segment 36 therebetween and the second end 34 attached to the support base 12. In various embodiments, the signal device 64 has a segment or section attached to an elongated body segment 36 of the pole 30 and the signal device 64 can extend away therefrom.

In certain embodiments, the above-listed portions might be removably attached to one another, slidably engaged, or otherwise configurable to achieve the purposes of providing notification and/or feedback to a waitperson. In particular embodiments, the ability of portions of the device 10 to be removably attached provides the benefit of allowing portions of the device 10 to be changed out with newer items of the same type, providing longevity to the device, or with alternative items, providing variability that may be more useful overall.

In use, embodiments of the device 10 allow a patron to provide information to a waitperson about the service interaction while minimizing awkward vocal exchanges. For example, with various embodiments of the device 10, a waitperson might be notified that a table requires attention, such as for refills or additional condiments, without the necessity of the patron awkwardly calling out to or waiving at the waitperson. In an additional example, with embodiments of the device 10, the patron might easily communicate their level of satisfaction with the service encounter, during the service encounter, to allow a waitperson to see if an issue might be lowering satisfaction, inquire about the issue if not apparent, and fix the issue if possible. The ability to communicate the needs of a patron without awkwardness may enhance the service encounter for a patron and lead to better tips for a waitperson. Indeed, information regarding the satisfaction of the service encounter might lead a waitperson to quickly identify and rectify issues that can lower the amount to be tipped.

Figure 1B:
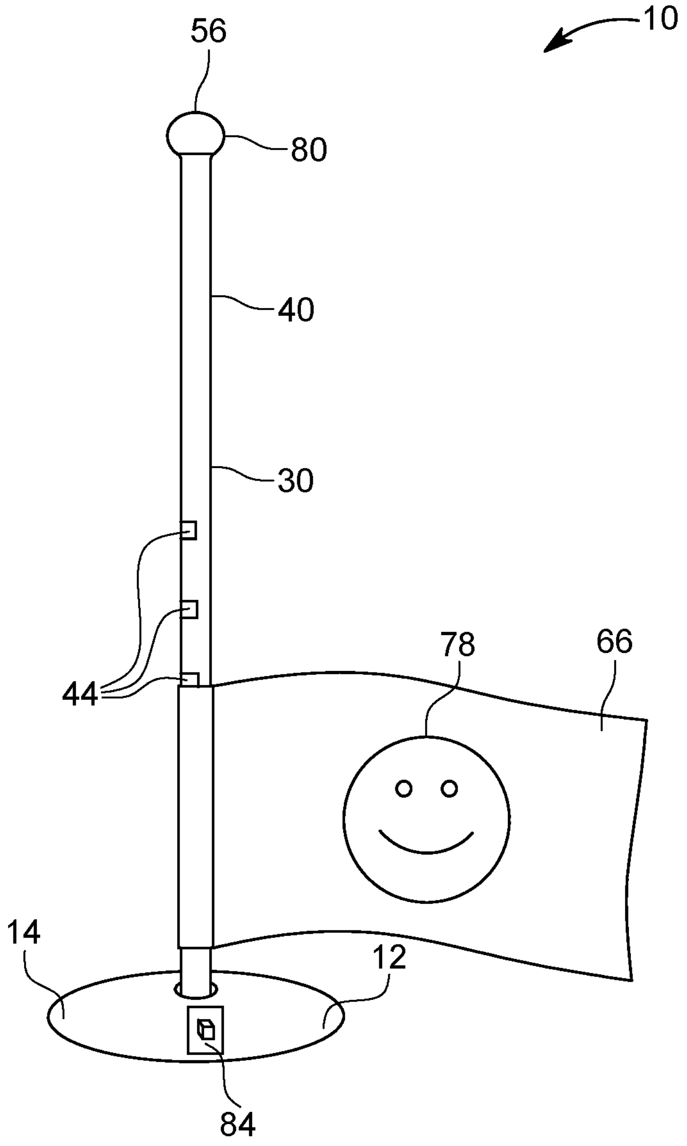
FIG. 1B illustrates a perspective view of a waitperson notification and feedback indicator device according to one or more embodiments including a pedestal and finite sized pole with a slidably engaging flag in a fully lowered position.

In particular embodiments, the device 10 has a pedestal 14 as a support base 12 and a fixed length pole 40 with a slidably attached flexible flag 66 as a signal device 64, as shown in FIGS. 1A-1B. In use, a patron can place the device 10 on a table or section of a bar nearby and slidably adjust the flag 66 up or down relative to the pole 30 to notify a waitperson that they require service or to provide feedback. For example, a fully raised flag 66—flag 66 closest to the first end 32 as in FIG. 1A—can indicate that a patron requires service, like needing napkins or a drink refill, in embodiments. In other embodiments, a fully raised flag 66 can indicate a patron is satisfied with service. In contrast, a fully lowered flag 66, as in FIG. 1B, can indicate a patron doesn't require service or is unsatisfied with service, in various embodiments. Moreover, the location of the flag 66 along the pole 30 between being fully lowered and fully raised can also have additional meaning to a request or for feedback in embodiments. For example, a user might be instructed to put the flag 66 only halfway up if they require service and all the way up if they would like their check.

In further embodiments, the flag 66 is removably affixed to the pole 30 and can be replaced with other flags 66, such as flags 66 having varied designs. In certain embodiments, each of the varied designs might have a separate or different meaning, such as indicating a level of satisfaction with the service or the requirement of attention. Thereby, the location of the flag 66 relative to the elongated body segment 36 and the specific design of a removably attached flag 66 allows the device 10 to provide both feedback on the service and notification that service is required in embodiments.

Figure 3:
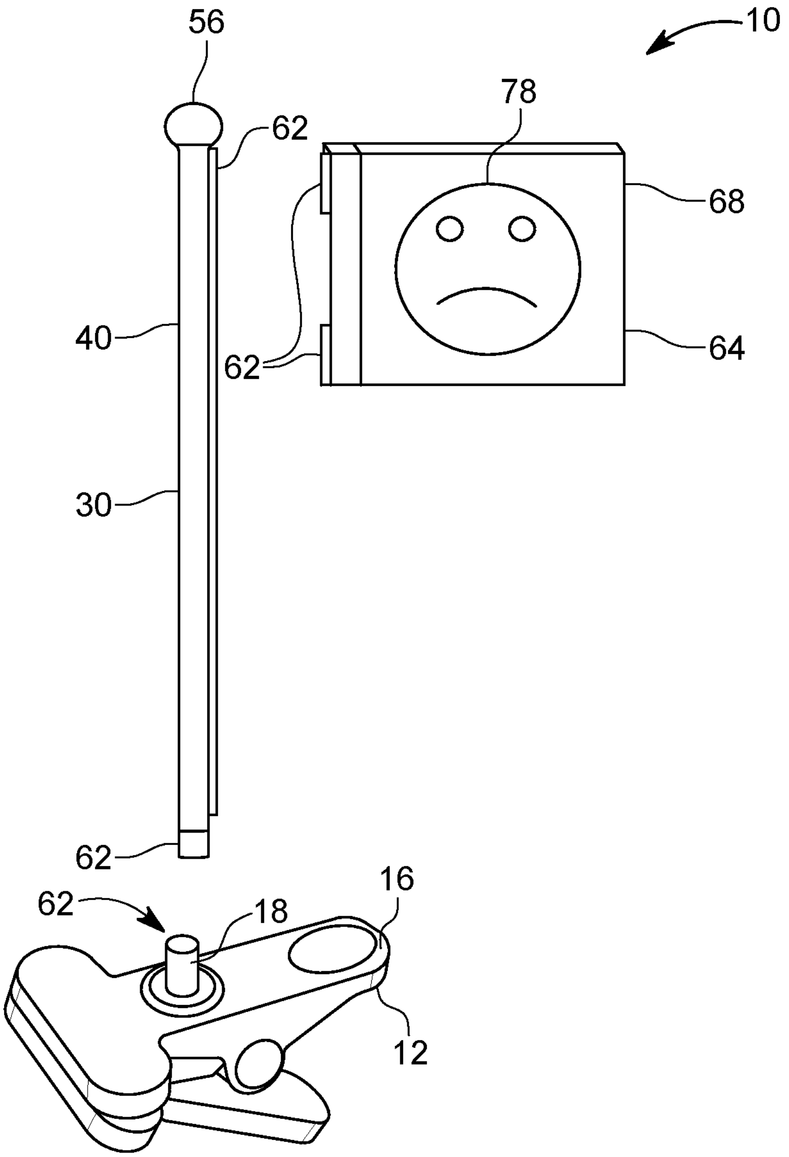
FIG. 3 illustrates a side elevation view of a waitperson notification and feedback indicator device according to one or more embodiments with a clip and finite length pole with a magnetically attached flag.

In additional embodiments, the device 10 includes a clip 16, as a support base 12, and a fixed length pole 40 having a slidably attached rigid panel 68, as a signal device 64, as shown in FIG. 3. In particular embodiments, the clip 16 has handle portions which operate jaw portions that move between an open position and a closed position. Indeed, in certain embodiments, the jaw portions of the clip 16 are biased towards the closed position. In use, embodiments of the clip 16 can be affixed to the edge of a table, securing the device 10 thereto. Use of a clip 16 as the support base 12 to secure the device 10 to a table can beneficially place the device 10 in a more noticeable location beside the table. Moreover, attaching the device 10 to a table edge through the clip 16 provides the benefit of not taking up table surface area, as the pedestal placed on the table might. In various instances, space on a table's surface might be limited enough that placement of an additional item, such as the device 10, might not be desired or feasible, making the attachment of the device 10 to a table edge a favorable alternative.

In further embodiments, a rigid panel 68 might be provided as a signal device 64 instead of a flexible flag 66 as in FIGS. 3 and 7A-8B. The rigid panel 68 can display more of its surface area and any accompanying design than a flexible flag 66, particularly a flag 66 at rest, so that the rigid panel 68 may be more noticeable in aspects. Moreover, in certain embodiments, the pole 30 may be removably attached to the clip 16, as in FIG. 3. Thereby, the clip 16 might be used for other purposes, such as clipping a bag closed or binding napkins together in a group, to increase the utility of the entire device 10 particularly when not in use.

Moreover, the device 10 might further comprise a variable length pole 42 affixed at an end thereof to a support base 12, as in FIGS. 4A-5A. In particular embodiments, the variable length pole 42 may be telescopic, extending (as in FIG. 4B) and retracting (as in FIG. 4A) in length in response to manipulation by a user. In certain embodiments, the signal device 64 may be stationary relative to the variable length pole 42. However, in alternative embodiments, the signal device 64 may be slidable relative to the variable length pole 42.

In use, a patron may extend or retract the variable length pole 42 by pushing or pulling the first end 32 of the pole 30 in embodiments. In further embodiments, a patron may alter the length of the variable length pole 42 by twisting a portion of the elongated body segment 36 thereof around an axis extending through the pole 30. In still additional embodiments, a portion of the elongated body segment 36 may be twisted to lock or unlock the length of the variable length pole 42 and the length may be altered, by pushing or pulling a portion of the pole 30. In embodiments, extending and retracting the variable length pole 42 can respectively raise and lower a signal device 64 affixed thereto. In further embodiments, the variable length pole 42 may be removably attached to a support base 12 to be replaced with another pole 30. A replaceable variable length pole 42 may allow for a different pole 30, such as a fixed length pole 40 or variable length pole 42, to be attached in embodiments. In further embodiments, the signal device 64 might be integrally formed with a particular variable length pole 42. Accordingly, the device 10 might include a plurality of variable length poles 42, each configured to removably attach to a support base 12 and each having an integrally formed signal device having a design or characteristics which has a particular meaning, such as indicating a particular service or satisfaction level. For example, a patron might attach a variable length pole 42 having a green flag 66 or panel 68 indicating a customer is happy with the service overall and can raise and lower the flag to indicate that they might need napkins or a refill.

Figure 6A:
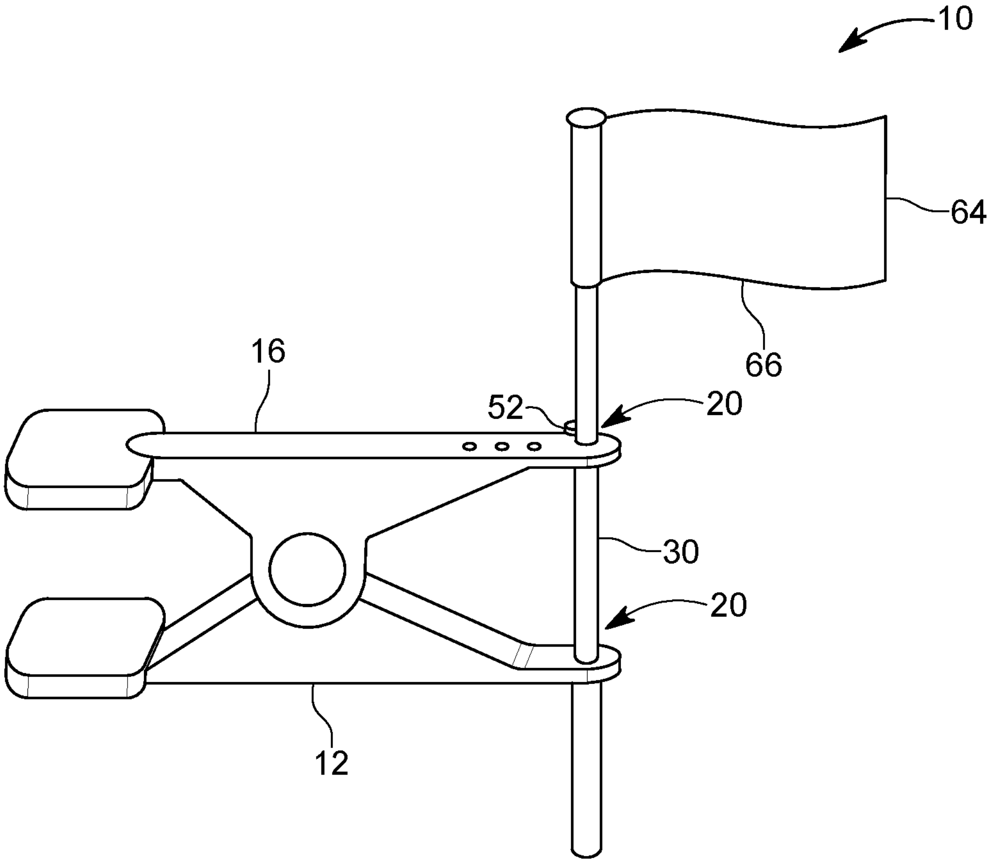
FIG. 6A illustrates a side elevation view of a waitperson notification and feedback indicator device according to one or more embodiments with a clip having holes in a handle and pole passing therethrough.
Figure 6B:
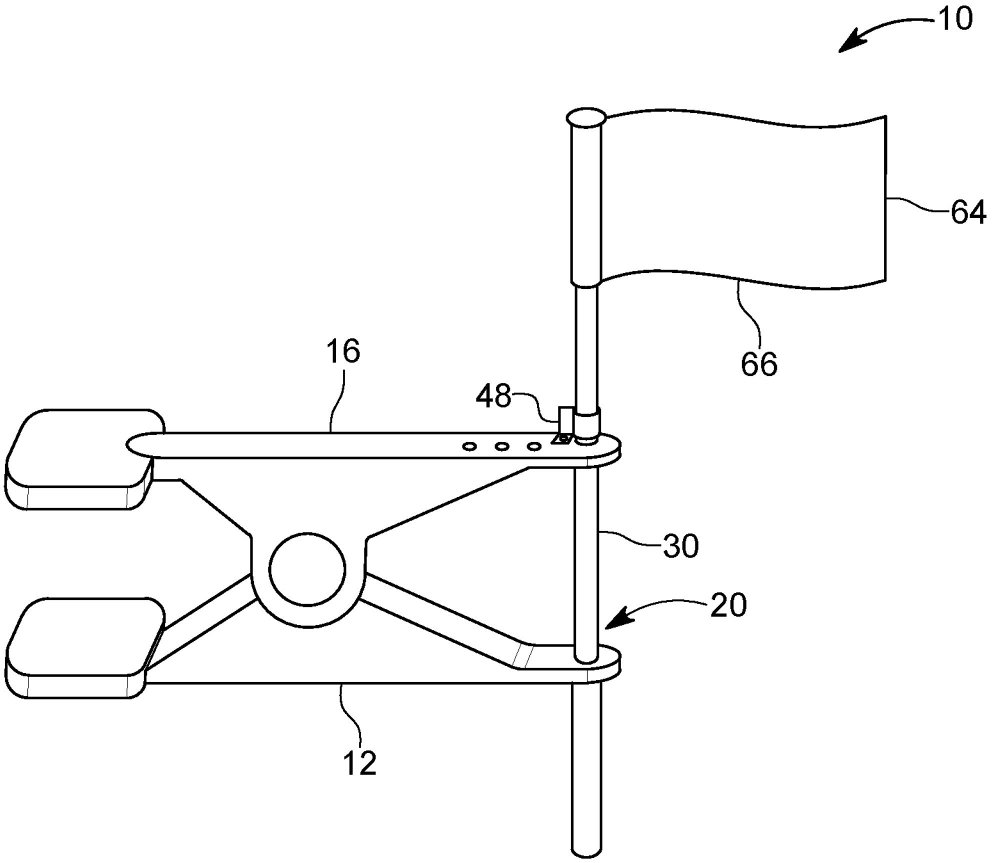
FIG. 6B illustrates a side elevation view of a waitperson notification and feedback indicator device according to one or more embodiments with a clip having holes in a handle and pole passing therethrough and an attached clamp to affix the pole position.
Figure 6C:
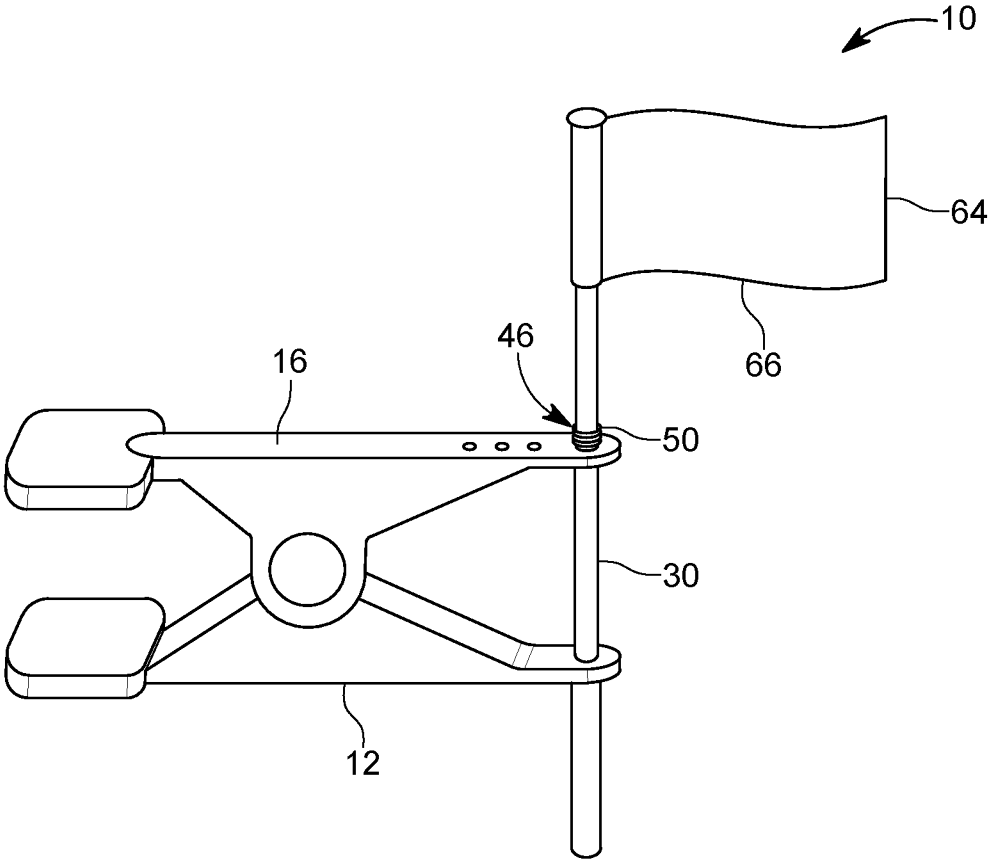
FIG. 6C illustrates a side elevation view of a waitperson notification and feedback indicator device according to one or more embodiments with a clip having holes in a handle and pole passing therethrough and a rubber band stopper apparatus.
Figure 6D:
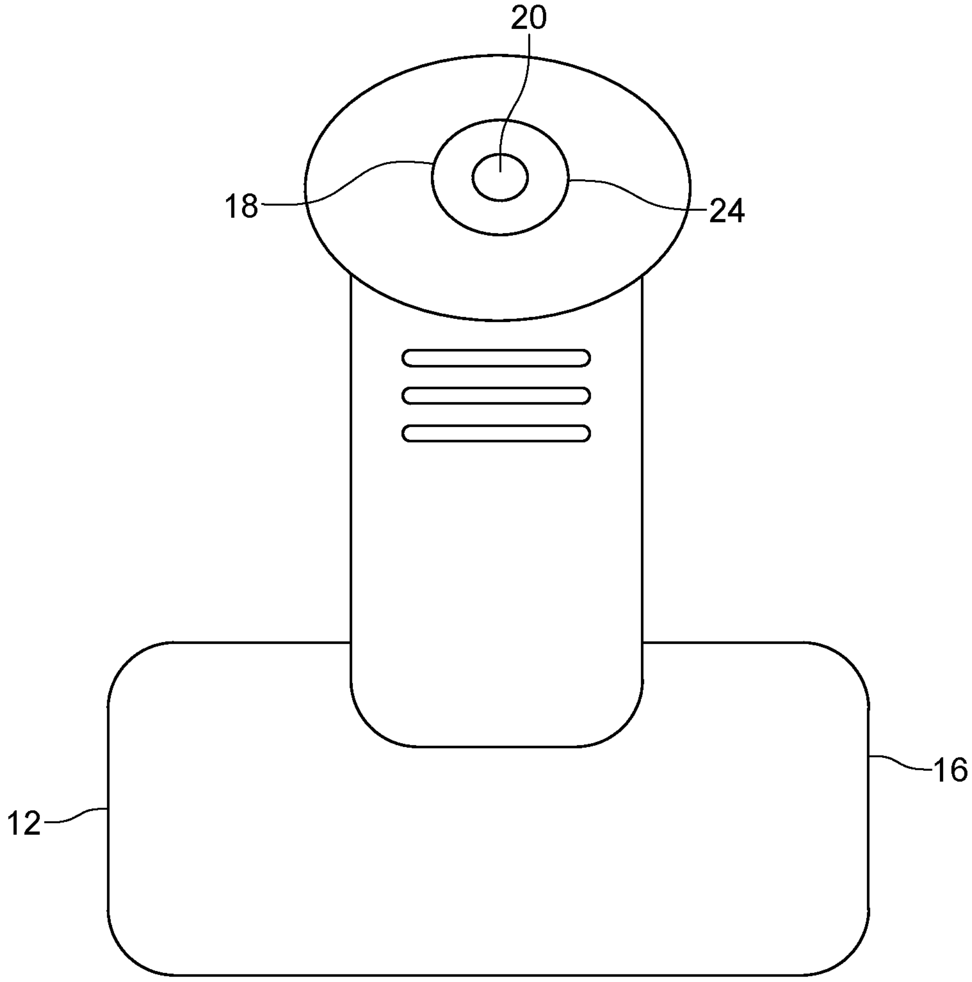
FIG. 6D illustrates a top view of a clip of a waitperson notification and feedback indicator device according to one or more embodiments with the clip having a hole in a handle and a gasket lining the hole.
Figure 7A:
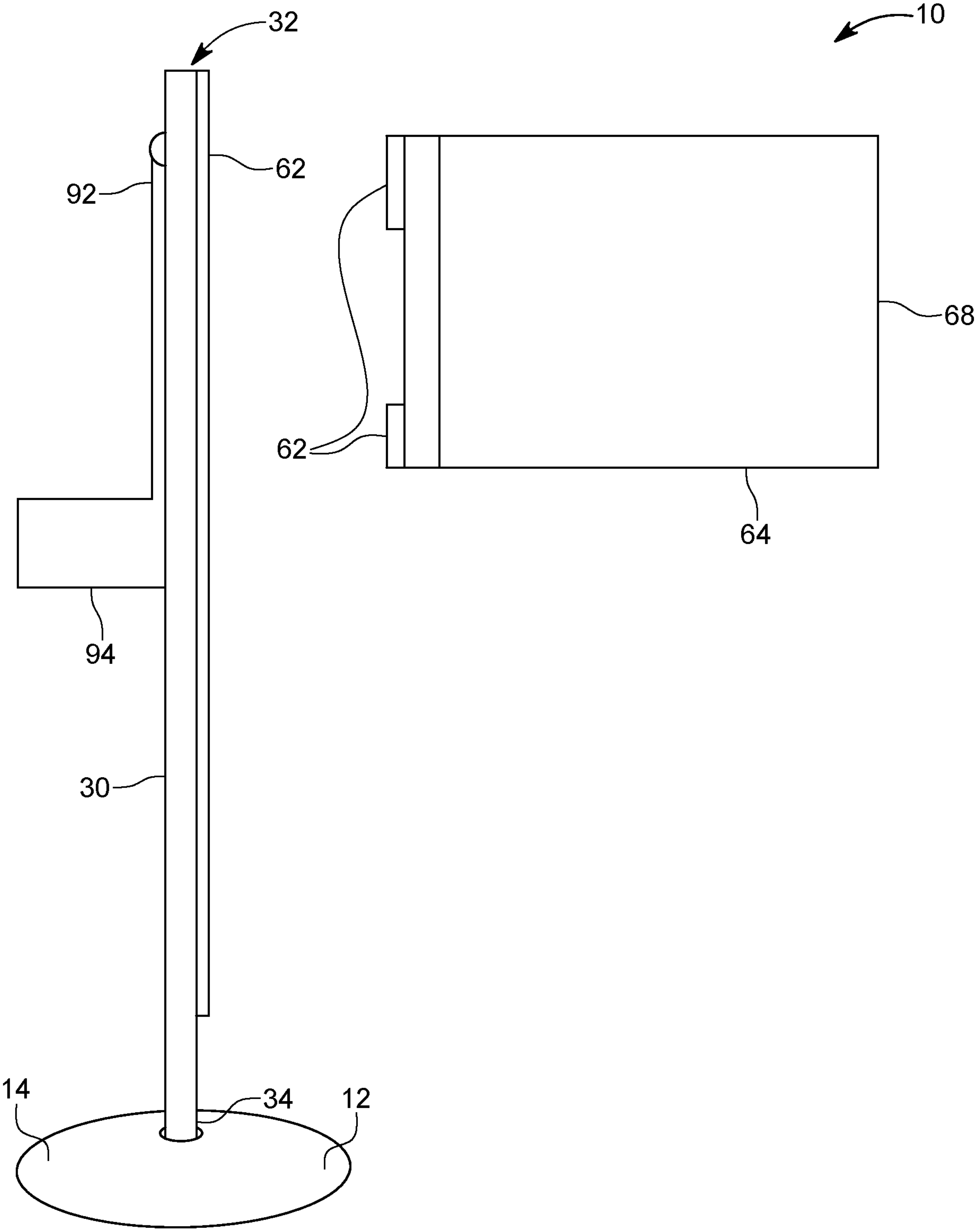
FIG. 7A illustrates a side elevation view of a waitperson notification and feedback indicator device according to one or more embodiments with a pivoting segment notification unit in a stored position.
Figure 7B:
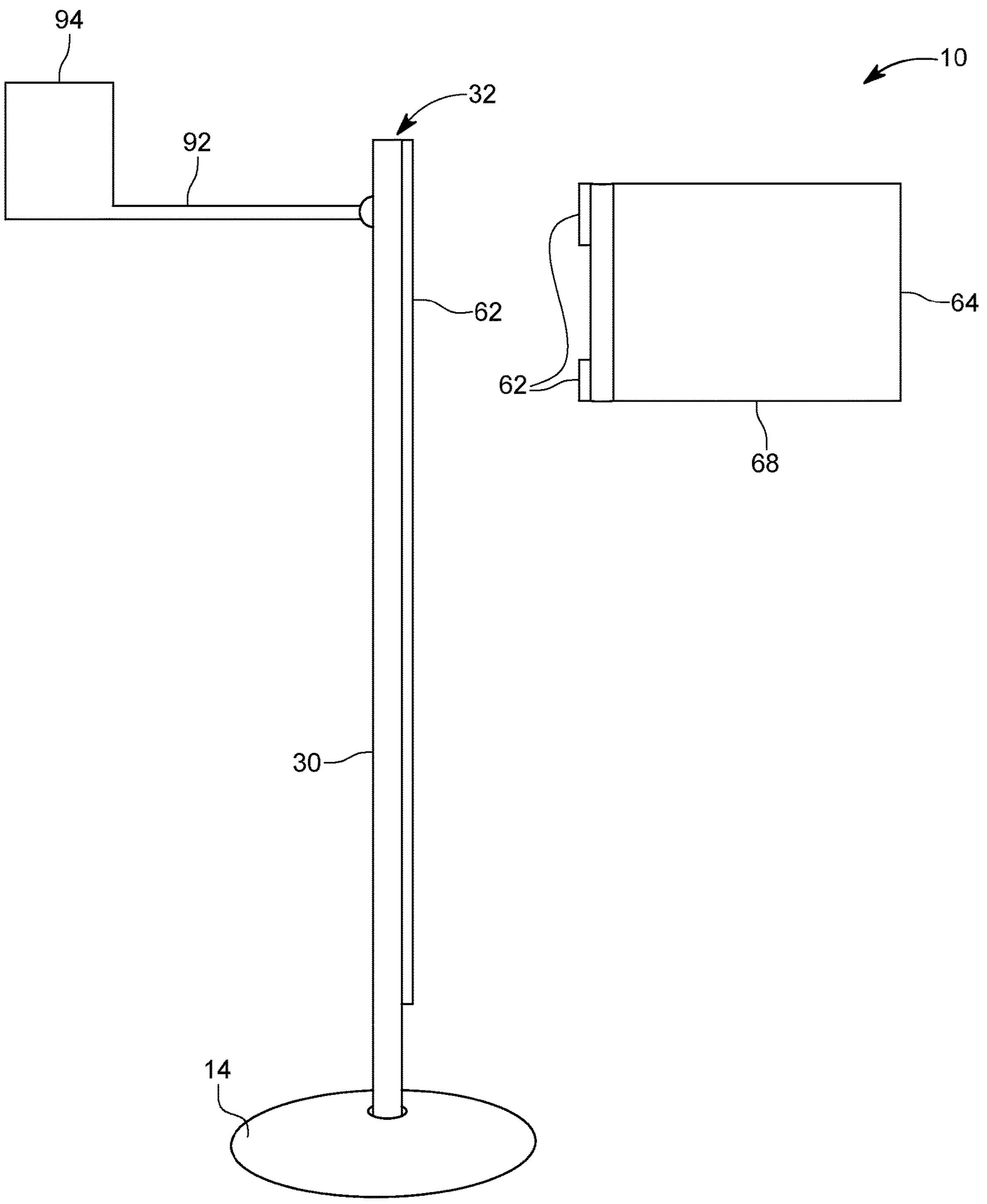
FIG. 7B illustrates a side elevation view of a waitperson notification and feedback indicator device according to one or more embodiments with a pivoting segment notification unit in a deployed position.

In certain embodiments, the device 10 may have a clip 16 as a support base 12 which includes apertures 20 (holes) through which a portion of the elongated body segment 36 of a pole 40 extends, as in FIGS. 6A-6C. In embodiments, the pole 30 may be affixed relative to the clip 16 and aperture 20 by being frictionally engaged by an engaging unit 18 affixed to a portion of the clip 16 or a stopper apparatus 46 adjustably attached to a pole 30 as in FIG. 6C. In use, a pole 30 inserted into aperture 20 may be frictionally engaged by the engaging unit, such as a clamp or gripping gasket 24 (as in FIG. 6D), to secure the pole 30. In particular to the stopper apparatus 46, the stopper apparatus 46 is configured to be impassable relative to the aperture 20 when affixed to the pole 30 in embodiments. Thereby, a pole 30 having a stopper apparatus 46, like a rubber band 50, clamp 48, or depressible button 52, affixed thereto is passed through the aperture 20 so the stopper apparatus 46 rests and is supported by a surface portion of the clip 16 in embodiments. Moreover, adjustment of the stopper apparatus 46 along the pole 30 can adjust the height of the signal device 64 above the clip 16.

Elements

While various features and elements have been described in reference to particular embodiments and variations above, it is to be understood that no limitation of the scope of this disclosure is hereby intended. Thereby, elements and features might be utilized in any combination and for any embodiment to which it is particularly useful. For example, a flag 66 might be slidably engaged along a variable length pole 42, should the variation thereof prove to be useful in a particular context. To further promote understanding of the principles of the present disclosure, additional discussion related to particular elements of the present discussion is provided below.

Support Base

While the support base 12 described in the preceding embodiments has been disclosed as being a pedestal 14 or a clip 16, other formation and variations might be utilized in additional embodiments. For example, the support base 12 in various embodiments may be integral with a table itself, such as in the case of a table having a hole to accept an end of a pole 30—thereby removing the need for a support base 12 separate from the table itself. Alternatively, a clamp or assembly of legs, forming a stand, affixed to or separate from a pole 30 might also be utilized in various embodiments of a support base 12. Moreover, it is foreseen that, in various embodiments, both a pedestal 14 and clip 1, or a plurality including any other support bases 12, might be provided so that they may be interchanged as necessary.

Further, it is also foreseen that the support base 12 might also include additional elements of structures to removably secure the pole 30 to the support base. For example, embodiments the support base 12 might have an aperture 20 with protrusions, such as a gripping gasket 24, to frictionally engage a portion of the pole 30 on a surface thereof proximate the second end 34 as in FIG. 6D. Moreover, the pole 30, particularly a second end 34 thereof, may be removably affixed to the support base 12 through mating threads 22 on the second end 34 of the pole 30 and in a cavity on the support base 12 in embodiments like that of FIG. 2. In an alternative embodiment, the second end 34 of the pole 30 may be removably affixed to a support base 12 through mating of a magnetic portion 62 on the pole 30 with a magnetic portion 62 on the support base 12 as in FIG. 3.

Figure 4A:
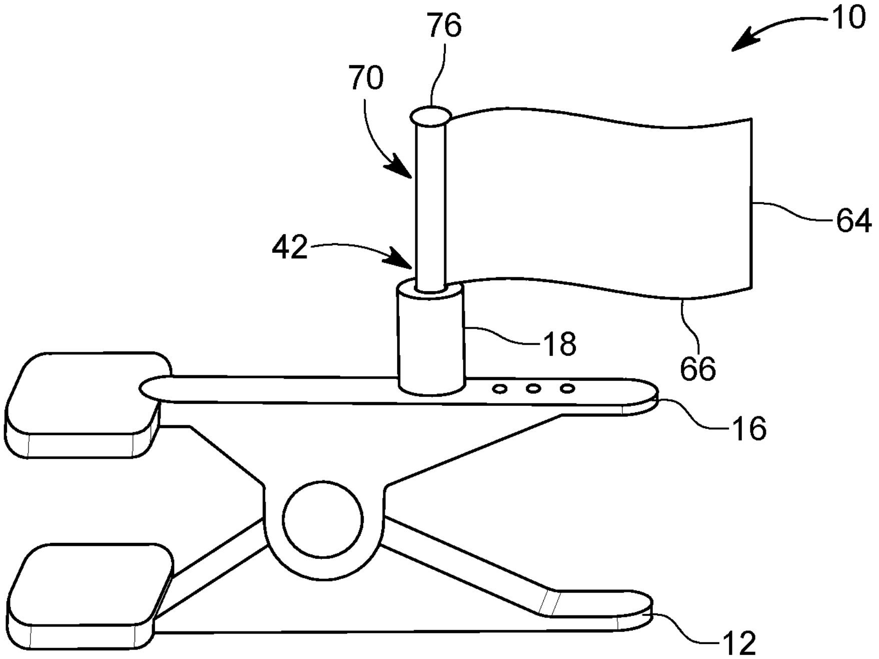
FIG. 4A illustrates a side elevation view of a waitperson notification and feedback indicator device according to one or more embodiments with a clip and a variable length pole in a retracted position.
Figure 4B:
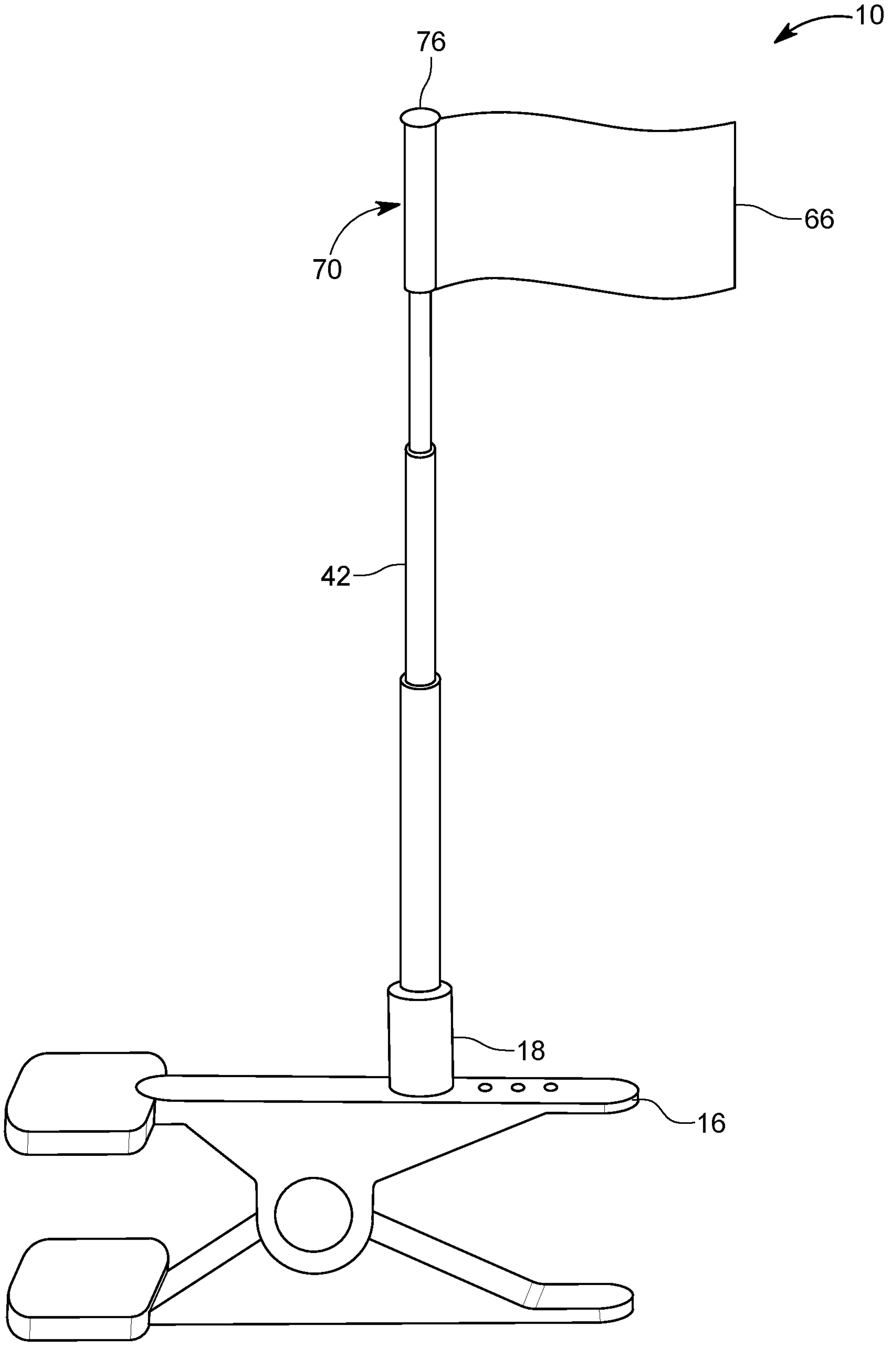
FIG. 4B illustrates a side elevation view of a waitperson notification and feedback indicator device according to one or more embodiments with a clip and a variable length pole in an extended position.
Figure 5A:
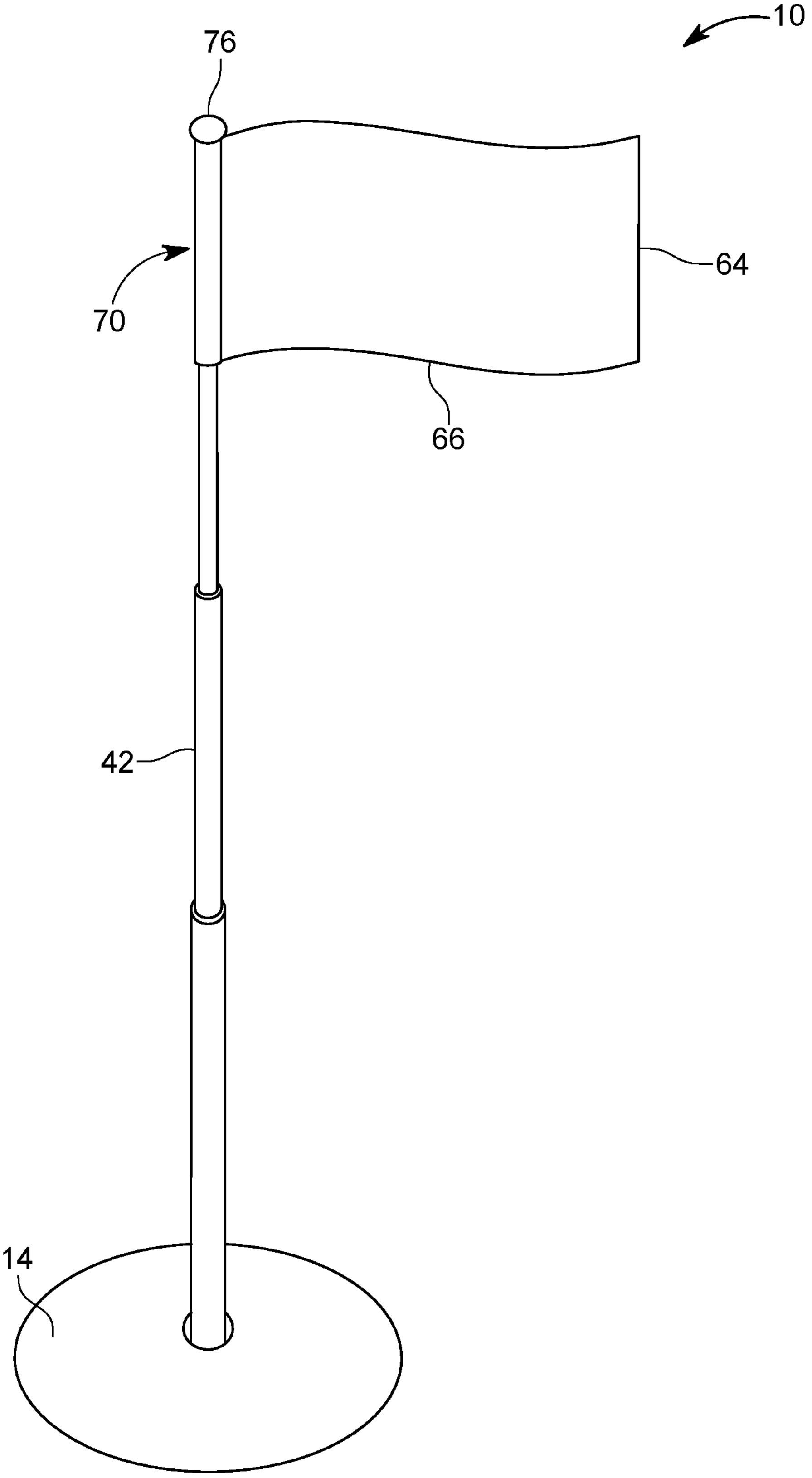
FIG. 5A illustrates a perspective view of a waitperson notification and feedback indicator device according to one or more embodiments including a pedestal and variable length pole.
Figure 5B:
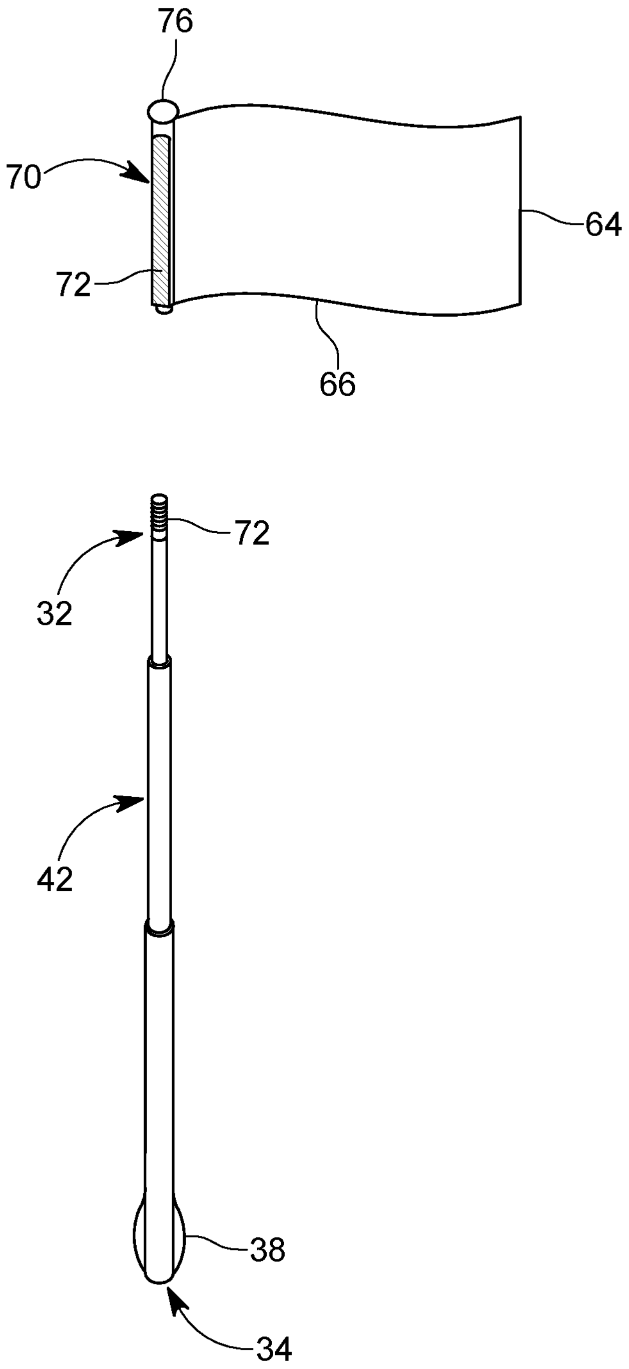
FIG. 5B illustrates a side elevation view of a waitperson notification and feedback indicator device according to one or more embodiments with a variable length pole and a signal device having a channel with threads to mate to the pole and a bulbous end.

Moreover, the support base 12 might further include additional elements, such as an engaging unit 18, to removably secure the pole 30 in a particular position as in FIGS. 4A and 4B. Indeed, the support base 12 might include an aperture 20 therethrough to allow a pole 30 to pass therein and an engaging unit proximate to the aperture 20 to secure a pole 30 in a particular position relative to the support base 12 in embodiments as in FIGS. 6A-6C. For example, the support base 12 might include a clamp 48 affixed to the support base 12 above an aperture 20 such that a pole 30 is prevented from being inserted through the aperture 20 or moved relative to the support base 12 unless the clamp 48 is released as in FIG. 6B. Similarly, the support base 12 might include a gripping gasket 24 lining an aperture 20 that frictionally engages a portion of the elongated body segment 36 of a pole 30 inserted therethrough as in FIG. 6D.

Figure 2:
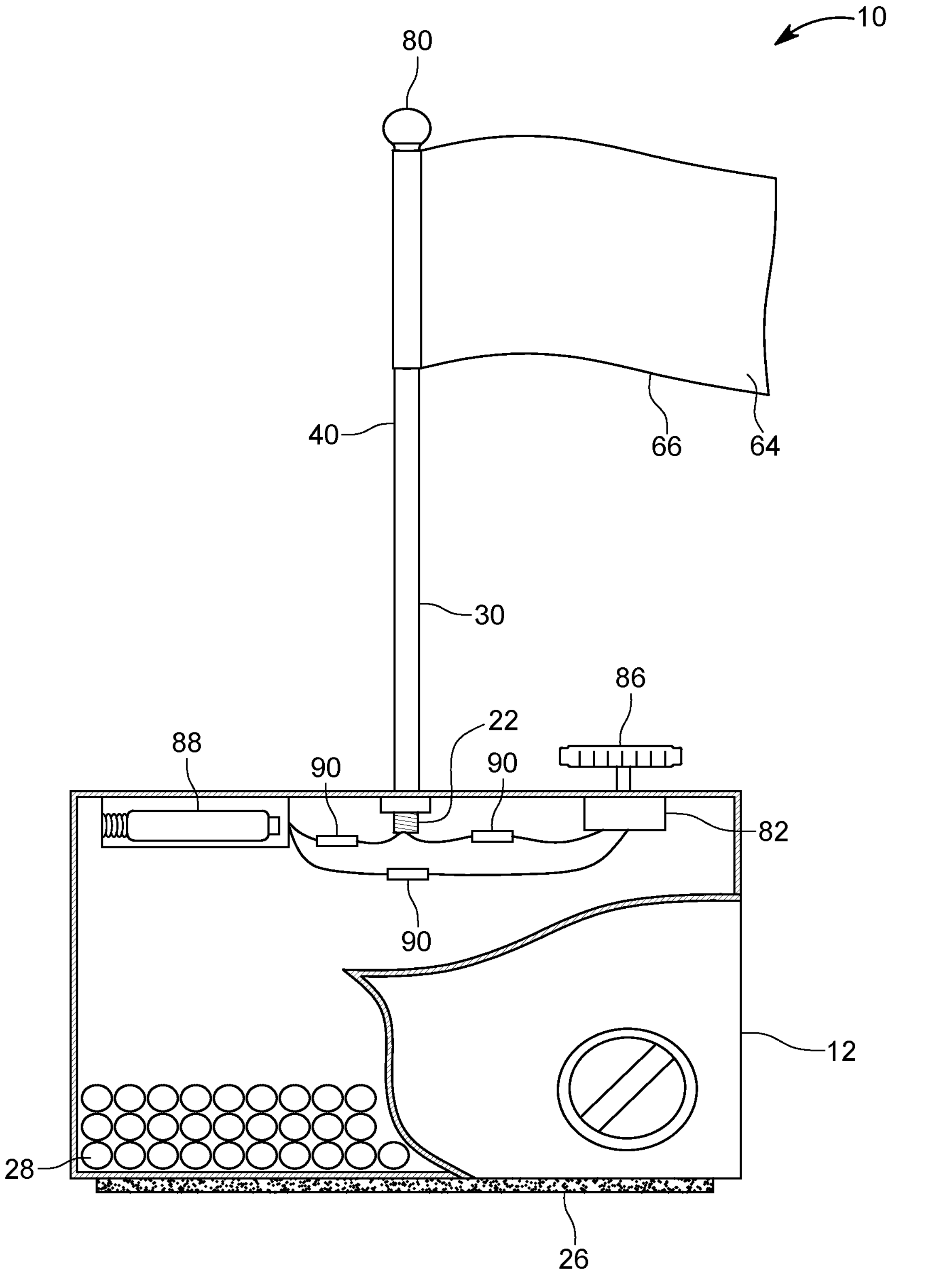
FIG. 2 illustrates a side elevation view of a waitperson notification and feedback indicator device according to one or more embodiments including a box as a support base having a power supply and control unit for a light and ballast.

Further, the support base 12 might further include additional adherent units 26 upon a portion thereof to help the support base 12 frictionally engage the surface upon which it is placed as in FIG. 2. In embodiments, a portion of a surface of the adherent unit 26 has a tacky texture which, when contacting a table, secures the support base 12 to the table until sufficient force has been applied thereto. Additionally, the adherent unit 26 might also include a segment of hook and loop fastener on a surface thereof that mates to another segment thereof affixed to the table to secure the support base 12 thereto in a specific embodiment. In a further embodiment, adherent unit 26 on support base 12 might also include one or more suction cups to secure the support base 12 to a table.

The support base 12, and any additional elements, might be constructed from any material, such as plastic, metal, or the like, and any combination of materials in various embodiments. In still yet another embodiment, the support base 12 is configured to add and remove ballast 28, varying the weight of the device 10 as in FIG. 2. The weight of the device 10 alters the stability of the device 10 in embodiments, making it less likely the device 10 may be knocked over. For example, the support base 12 might be filled with glass beads or sand to provide weight and prevent inadvertent falling or tipping of the device 10.

Pole

While the pole 30 in the preceding embodiments above has been disclosed as a fixed length pole 49 or variable length pole 42, such as a telescoping pole, it is also foreseen that the pole 30 disclosed might have any size or shape cross section and may be any length in various embodiments. Indeed, the cross section of the pole 30 might be round, triangular, square, rectangular, pentagon, hexagon, heptagon, or the like in shape. Moreover, the pole 30 might have a plurality of segments which have different size cross sections which frictionally engage when fully extended, along adjustment of the length of the pole one segment at a time as in FIG. 5B. Also, the pole 30 might have an interior 60 that is fully or partially hollow As in FIGS. 8A and 8B.

Further, the pole 30 may be any of a variety of lengths, in embodiments. Indeed, longer poles 30 might be useful in embodiments where the height of a signal device 64, slidable engaged thereupon, is used to communicate satisfaction with a service interaction as it may provide more distinctive variations in height, where each distinct variation provides a distinct rating related to the satisfaction of the patron with the service interaction. In fact, in embodiments the pole 30 may also include visible height indicators 44, such as notches or lines, to mark the distinct heights, each of which can indicate a separate meaning or rating as in FIGS. 1A and 1B. However, shorter poles 30 might be more useful in embodiments where the device 10 is used only for notification purposes or feedback from the device 10 is limited.

The pole 30 is configured to accept a portion of the signal device 64 to support it in embodiments. Indeed, in certain embodiments, the pole 30 might have certain portions that facilitate the attachment of the signal device 64. For example, the pole 30 might further include one or more magnetic portions 62 which are configured to mate with one or more magnetic portions 62 of a signal device 64 as in FIGS. 3 and 7A-8B. Magnetic portions 62 might be disposed at a first end 32, a second end 34, or along the elongated body segment 36 of the pole 30.

Additionally, in embodiments the pole 30 might also have a stopper apparatus 46 designed to help support a pole 30 at a particular height relative to a support base 12 as in FIGS. 6A-6C. As disclosed previously, the stopper apparatus 46 is generally utilized in embodiments where the support base 12 includes an aperture 20. In embodiments, the stopper apparatus 46 disposed along one or more portions of the pole 30 prevents that portion of the pole 30 from passing through the aperture 20. Thereby, the stopper apparatus 46 can be utilized to affix the pole 30 at a particular height or prevent separation of the pole 30 from the support base 12, in various embodiments. In embodiments, the stopper apparatus 46 may be removably affixed and/or adjustable relative to the length of the pole 30, such as with a clamp 48 or rubber band 50. In alternative embodiments, the stopper apparatus 46 may be integral to the pole 30, such as a depressible button 52 or enlarged portion 38. Indeed, an enlarged portion 38, such as an enlarged second end 34 (as in FIG. 5B) having a cross section larger than the apertures 20 in a specific embodiment of the support base 12, can limit the pole 30 from being removed from attachment with the apertures 20 in that support base 12. Also, in certain embodiments, the pole might have an end piece 54, such as a knob 56, which could be removably attached to prevent the pole from passing through an aperture, in certain embodiments, or secure an end of the pole from allowing a sliding flag to be removed therefrom. In addition, it is foreseen that an end of the pole might have screw threads to mate with and secure the pole to screw threads in one or both of the support base and signal device.

Signal Device

Moreover, while the signal device 64 in the preceding embodiments is disclosed as a rectangular flexible flag 66 or a rigid panel 68, other shapes and structures might be suitable for notification and feedback purposes in various embodiments. Indeed, the signal device 64 might be circular, square, triangular or any other shape in various embodiments. Moreover, the signal device 64 may also include a segment or portion that affixes to the pole 30. Indeed, this segment or portion might include a channel 70 into which the pole 30 is slidably received as in FIGS. 5A and 5B. Moreover, the channel 70 may further comprise threads 72 which can match threads on portions of the pole 30 to facilitate the movement of the signal device 64 relative to the pole 30. Additionally, the signal device 64 can further include one or more connectors that can slidably affix to the pole 30. For example, the signal device includes C-shaped clamp connectors, with a diameter slightly smaller than the pole 30 itself, to facilitate secure attachment, in embodiments. In certain embodiments, the segment or portion of the signal device 64 that attaches to the pole 30 may be removably affixed to or integral with the signal device 64 in embodiments. For example, the signal device 64 might comprise a removably affixed mount that includes a channel 70 through a length thereof and exterior attachments, such as a pinching slot or mating magnetic portions or hook and loop fastener portions, that affix to a flexible flag 66 or rigid panel 68 in embodiments thereof.

In embodiments, the signal device 64 is slidable relative to the pole 30 with a channel 70 through which the pole 30 passes that also frictionally engages the pole 30, securing the signal device 64 to a portion thereof as in FIGS. 1A and 1B. To facilitate frictional engagement, the channel 70 can be sized so that it more firmly secures the pole 30, such as being the same or slightly smaller diameter as a cylindrical pole. Moreover, the channel 70 may also include a gasket or rubber lining portion to facilitate frictional engagement. However, in certain embodiments, the signal device 64 can be freely slidable relative to the pole 30, particularly in instances where additional attachments are utilized on the pole 30, such as clamps or rubber bands, to position and fix the position of the signal device 64 on the pole 30. Further, the signal device might have a portion which acts as a cap 76 that affixes to the first end 32 of a pole 30 to secure the signal device 64 thereto in embodiments as in FIG. 5B. In certain embodiments, the cap 76 also includes threads that mate with threads proximate the first end 32 of the pole 30. Thereby, the signal device 64 also includes an attachment that screws into or onto the first end 32 of the pole 30 in embodiments, like that of FIG. 5B. Accordingly, the signal device 64 can be affixed to be stationary or movable, relative to the length of the pole 30. Indeed, in embodiments, the signal device 64 may be removed and attached, rather than slid, to facilitate movement relative to the length of the pole 30.

Moreover, it is also foreseen that the signal device might have one or more magnetic portions 62 removably attached or integral to a portion thereof to engage a metallic surface or mate with additional magnetic portions 62 as in FIGS. 3 and 7A-8B. Indeed, the pole 30 may be made with or have a surface of a ferrous material or have one or more magnetic portions 62 attached thereto to which magnetic portions 62 of the signal device attach. Similarly, the signal device 64 can be made of or have a surface having a ferrous material to engage magnetic portions 62 of the pole 30. For, the magnetic portions 62 of the pole 30 might be disposed within, and potentially movable within, so that a signal device 64 with an edge made of ferrous metal is affixed to the pole 30 based on the location of the magnetic portions 62 of the pole 30 in at least one embodiment. The utilization of magnetic portions 62 in embodiments provides the ability to facilitate connection that is not subject to the same risk of mechanical failure as some of the connectors.

The signal device 64 and any additional elements affixed thereto might be constructed of one or more of a variety of materials. For example, a flexible flag 66 might be made of one or more of cotton, nylon, or other fabric, in embodiments. Alternatively, the rigid panel 68 might be made of or with a rigid material, like certain polymers, in embodiments. A rigid panel 68 provide the benefit that the whole surface area thereof might be visible, unlike certain embodiments of the flexible flag 66. Moreover, it is also foreseen that the signal device 64 and/or elements thereon might be made of or with metal, as well. Furthermore, the signal device 64 may be made with any color, design 78, or combination thereof. Indeed, in embodiments, the design 78 of the signal device 64 can have a specific meaning related to the satisfaction of the patron or their need for a waitperson as in FIGS. 1A and 3. In fact, a variety of signal devices 64, each having a different design 78 and carrying a different meaning might be provided and utilized with the device 10. Thereby, the device 10 can provide a large variety of customizable feedback.

Lights

In various embodiments, the device 10 may further include lights 80 to increase visibility of the device 10 as in FIGS. 1A-2. In embodiments, one or more portions of the device 10 may also include various other electronic circuits integrated therein to accommodate the inclusion and control of the lights 80. For example, the support base 12 might include lights 80 and a control unit 82, such as a switch 84 or dial 86, to control the lights 80. In certain embodiments, lights 80 might be disposed on one or more of the support base 12, pole 30, and signal device 64. In further embodiments, a control unit 82, such as a switch 84 or dial 86, might be disposed on any of the portions of the device 10, even if that specific portion does not include lights 80 as in FIG. 2. Also, in embodiments where the pole includes a control unit 82, the control unit may be housed in the knob 56 on an end of the pole 30 so that it may be actuated to control the lights 80 disposed along a portion of the device 10. In at least one embodiment, a light 80 may be disposed within the knob 56 of the pole 30 and configured to be controlled by a switch 84 also disposed within the knob 56 such that the pressing the knob 56 would cut the light 80, housed therein, on and off. Indeed, in such an embodiment the switch 84 may employ one or more springs to facilitate actuation and movement of the switch 84. In another embodiment, the knob 56 may be deformable so that pressing on the knob 56 can facilitate access and actuation of a switch 84 to turn on and off one or more of the lights 80, such as those disposed within the pole 30 or the knob 56. Thereby, in embodiments, a customer may cut on a light 80 to indicate they require service or to reflect their satisfaction with the service.

Similarly, the device may also include a power supply 88 therein, in embodiments like in FIG. 2. Indeed, while the power supply 88 might be a standard power cord to be connected with an outlet, it could also be batteries disposed within a portion of the device 10. For example, the support base 12 might include one or more batteries therein, as a power supply 88, electrically coupled with lights 80 in the pole 30, in embodiments. Alternatively, the pole 30 or signal device 64 might incorporate all or a portion of the power supply 88 in embodiments.

Further, the device 10 may also include one or more power connectors 90 between various electrically coupled elements in embodiments as in FIG. 2. For example, an embodiment of the device might selectively connected power connectors 90 between the power supply 88 and the control unit 82 and between the control unit 82 and the lights 80. Further, in certain embodiments, power connectors 90 may be disposed between the power supply 88 and the lights 80 directly. In embodiments, power connectors 90 can allow for various electrically coupled devices to be decoupled so that portions can be replaced or repaired. Moreover, in at least one embodiment, power connectors 90 can be disposed on both an end of the pole 30, like the second end 34, and engaging unit 18 of the support base 12 so that lights 80 in one portion of the device 10 can be controlled and/or powered by devices in another portion of the device 10.

Moreover, a portion of the device 10, like the support base 12, might also include a digital readout display for a clock or feedback message related to the activation of the lights 80 in various embodiments. For example, the digital readout could read a simple message, such as "ON", to indicate the lights 80 on the device 10 are active. Moreover, the digital readout could identify a color, in embodiments where actuating a control unit 82 also changes the color of lights 80 on the device 10. Alternatively, in an embodiment where actuation of the control unit 82 involves the changing of a color of one or more lights 80 and the digital readout is provided, the message provided might relate to the meaning of a specific color, such as red lights 80 meaning "HELP."

Further, in embodiments, the signal device 64 may incorporate lights 80. For example, the signal device 64 in various embodiments might comprise a small LED panel which is optionally capable of having customizable colors or designs. In another exemplary embodiment, the signal device 64 might comprise a small electroluminescent (EL) panel. In embodiments where the signal device includes lights 80, a control unit 82 and/or power supply 88 might be located in the signal device 64, the pole 30, or the support base 12.

Notification Unit

In additional embodiments, the device 10 might also include a notification unit 92, separate from the signal device 64, as in FIGS. 7A-8B, that notifies a waitperson that service is required or provides feedback regarding the satisfaction of a customer with the service. In embodiments, the notification unit 92 is a strip or column that adjusts from a stored position into a deployed position, extending away from the pole 30 of the device 10. In at least one example embodiment, the notification unit 92 might comprise a pivoting segment 94 connected at one end to the pole 30 about which the segment pivots wherein a second opposite end of the pivoting segment 94 moves from a stored position adjacent the pole 30 into a deployed position extending away therefrom as in FIGS. 7A and 7B. Indeed, the pole 30 may include a slot or channel in an exterior thereof wherein a portion of the pivoting segment 94 is inserted when in the stored position, in embodiments. However, the pivoting segment 94 may be attached to the pole 30 so that rests in a generally parallel position to the pole 30 when in the stored position in certain embodiments. Thereby, in an embodiment, a customer may move the pivoting segment 94 into a deployed position to indicate that the customer needs service or to provide feedback on the customer's satisfaction with the service.

Figure 8A:
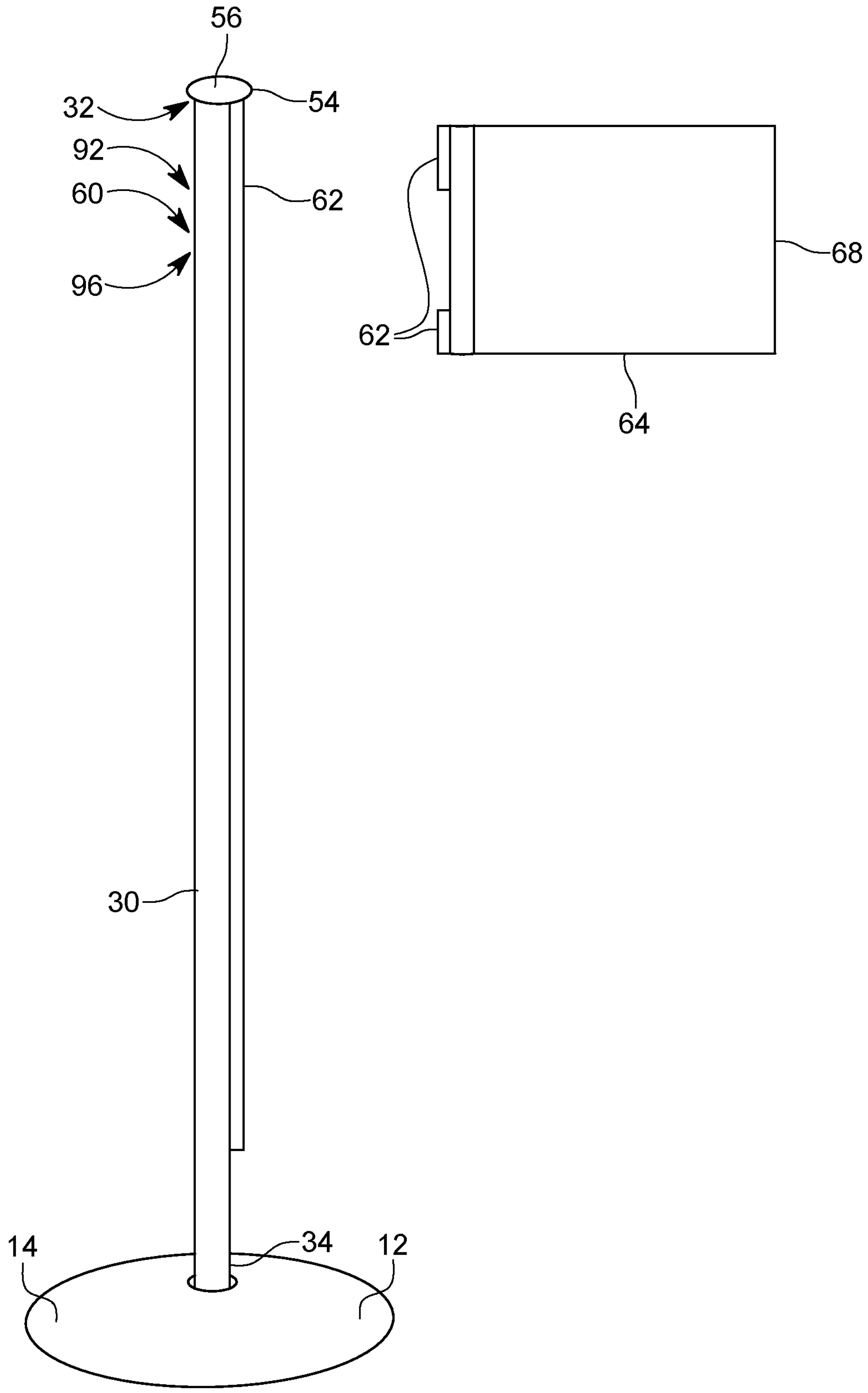
FIG. 8A illustrates a side elevation view of a waitperson notification and feedback indicator device according to one or more embodiments with an extending segment notification unit in a stored position.
Figure 8B:
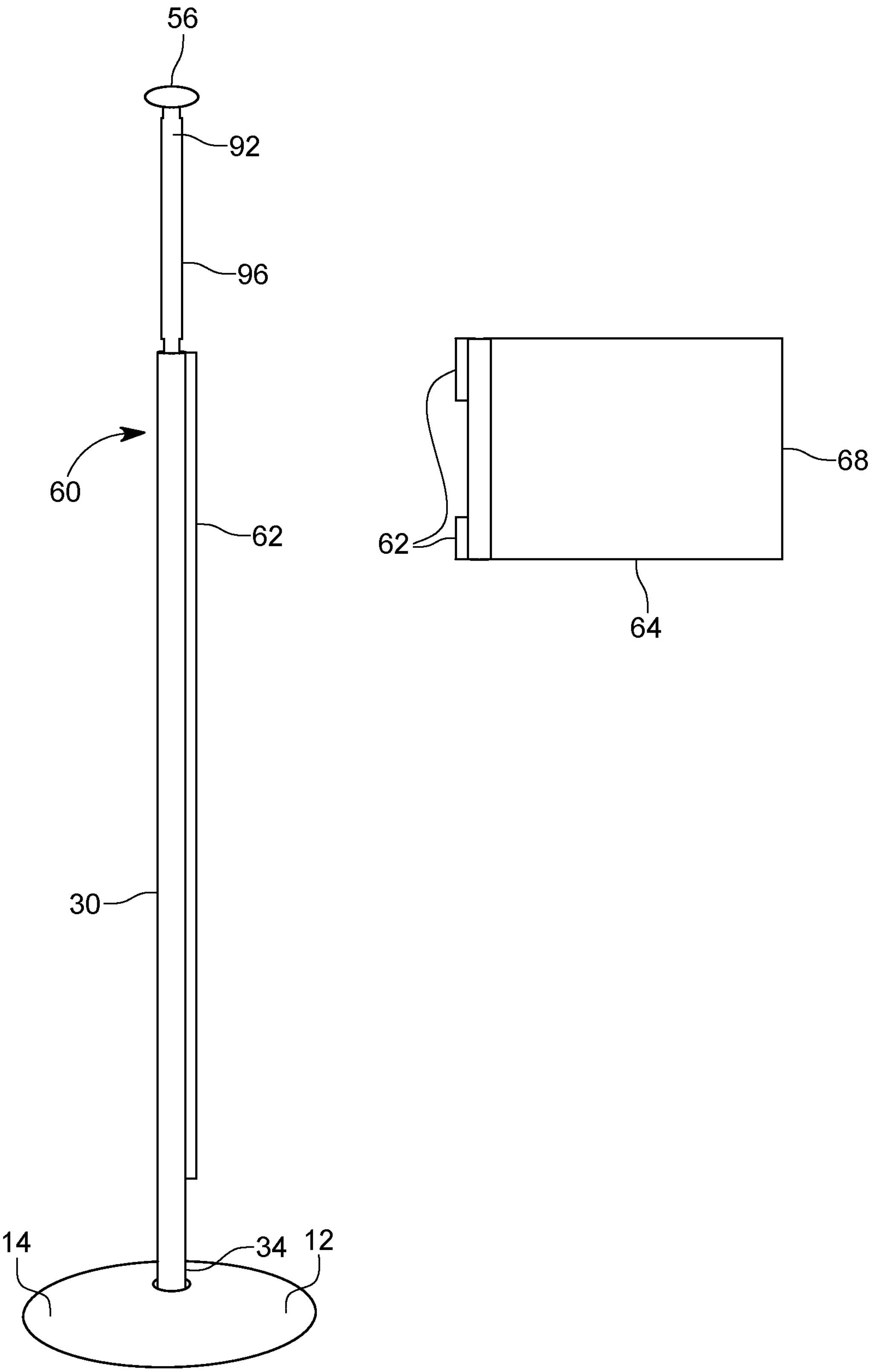
FIG. 8B illustrates a side elevation view of a waitperson notification and feedback indicator device according to one or more embodiments with an extending segment notification unit in a deployed position.

In yet another embodiment, the notification unit 92 may comprise an extending segment 96 which houses within a portion of the device 10, such as the interior 60 of the pole 30, when in the stored position as in FIG. 8A. Indeed, the extending segment 96 may be disposed within the first end 32 of the pole 30 in a stored position and deployed outward therefrom in embodiments like in FIG. 8B. In fact, in certain embodiments, at least a portion of the extending segment 96 may be biased by a spring-loaded mechanism into one or more of the stored and deployed positions. For example, an end of the extending segment 96 may form a knob 56 on the first end 32 of the pole 30 which can be pushed to actuate a mechanism to unlock and extend the knob 56 of the extending segment 96 away from the pole 30 through the spring-loaded mechanism in embodiments. In additional embodiments, pressing the knob 56 when the extending segment 96 is within the pole 30 may also lock the extending segment 96 into the stored position by means of the spring-loaded mechanism. For example, a user may press the knob 56 and, due to a spring-loaded mechanism in the interior 60 of the pole 30, an extending segment 96 in an initially stored position may extend and be biased out from the pole 30 into a deployed position in an embodiment. Likewise, a user may press the knob 56 and the extending segment 96 in a deployed position may be reinserted and locked a stored position within the interior 60 of the pole 30 in an embodiment. In a further embodiment, the extending segment 96 might be a umbrella, similar to a cocktail umbrella, that opens when moved from the stored to a deployed position and closes when moved from the deployed to a stored position. Thereby, in an embodiment, a customer may move the extending segment 96 into a deployed position to indicate that the customer needs service or to provide feedback on the customer's satisfaction with the service.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer, or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below," "beneath," "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced items. Although any methods, devices, and materials similar or equivalent to those described herein can be used in the practice or testing of the presently disclosed subject matter, representative methods, devices, and materials are now described.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A notification and feedback device comprising:

a clip comprising jaw portions and handle portions, wherein the handle portions are configured to actuate the jaw portions between an open position and a closed position;

a pole comprising a first end and second end connected by an elongated body segment, wherein the pole is coupled to the clip by one of (i) attachment of the second end to a surface of one of the handle portions and (ii) disposition of the elongated body segment through an aperture defined in each of the handle portions such that the first end and the second end of the pole are disposed on opposed sides of each handle portion;

a signal device attached to the pole between the first end and the second end; and a light and a control unit disposed within a resiliently deformable end piece at the first end of the pole, wherein the light is configured to be selectively activated by the control unit and the control unit is configured to be selectively actuated by manipulation of the end piece.

2. The device of claim 1, wherein the end piece is removably connected to the first end of the pole.

3. The device of claim 1, wherein the signal device is attached to the pole through magnetic portions affixed to or disposed within the elongated body segment.

4. The device of claim 3, wherein the magnetic portions are adjustably movable.

5. The device of claim 1, wherein the pole is affixed to the clip through mating magnetic portions.

6. The device of claim 1, further comprising a power supply disposed within at least one of the pole, the signal device, and the clip.

7. The device of claim 6, wherein the power supply and at least one of the light and the control unit are operably connected through a power connector.

8. The device of claim 1, wherein each handle portion defines a respective said aperture and the elongated body segment is disposed through each respective aperture and wherein the device further comprises a gasket disposed around the perimeter of each respective aperture, the gasket configured to frictionally engage the portion of the elongated body segment disposed through each respective aperture.

9. The device of claim 1, wherein each handle portion defines a respective said aperture and the elongated body segment is disposed through each respective aperture and wherein the device further comprises an engaging unit disposed adjacent at least one of the respective apertures, the engaging unit configured to selectively actuate between a first open position and a second closed position wherein the engaging unit frictionally engages the elongated body segment in the second position.

10. The device of claim 1, wherein each handle portion defines a respective said aperture and the elongated body segment is disposed through each respective aperture and wherein the device further comprises a stopper apparatus disposed along the elongated body segment, the stopper apparatus configured to be impassable through at least one of the respective apertures.

11. The device of claim 10, wherein the stopper apparatus is removably affixed to the elongated body segment.

12. The device of claim 10, wherein the stopper apparatus comprises a depressible button disposed along a surface of the elongated body segment.

13. The device of claim 1, wherein the pole is configured to be variable in length between the first end and the second end.

* * * * *